United States Patent [19]
Cuba et al.

[11] Patent Number: 5,187,348
[45] Date of Patent: Feb. 16, 1993

[54] WELD ELECTRODE-TO-WORKPIECE ARC GAP SETTING APPARATUS AND METHOD

[75] Inventors: Gary W. Cuba, Hopkins; Robert D. Isaacson, Columbia; David V. Lambert, St. Matthews, all of S.C.

[73] Assignee: Westinghouse Electric Corp., Pittsburgh, Pa.

[21] Appl. No.: 784,959

[22] Filed: Oct. 30, 1991

[51] Int. Cl.⁵ .............................................. B23K 9/12
[52] U.S. Cl. ............................. 219/124.02; 219/125.1
[58] Field of Search .................... 219/124.01, 124.02, 219/125.1, 124.03

[56] References Cited

U.S. PATENT DOCUMENTS

| | | | |
|---|---|---|---|
| 3,102,948 | 9/1963 | McCampbell et al. | 219/137 |
| 3,508,107 | 4/1970 | Jones | 219/124.02 |
| 3,975,616 | 8/1976 | Siktberg et al. | 219/131 F |
| 4,112,289 | 9/1928 | Mead et al. | 219/124.33 |
| 4,439,664 | 3/1984 | Toohey | 219/124.02 |
| 4,463,298 | 7/1984 | Halbauer | 318/662 |
| 4,795,882 | 1/1989 | Hardwick et al. | 219/124.02 |
| 4,897,521 | 1/1990 | Burr | 219/124.03 |
| 4,918,287 | 4/1990 | Yeo | 219/137 PS |

Primary Examiner—Clifford C. Shaw

[57] ABSTRACT

An apparatus for setting an arc gap between a weld electrode and a workpiece includes a control arrangement and a direct current stepping motor operated in a forward mode by the control arrangement to move the weld electrode toward and away from the workpiece to respectively advance and retract the electrode into and from physical contact with the workpiece. The apparatus also includes an electrical circuit connected to the weld electrode and the workpiece for defining an electrical path to supply electrical energy sufficient to generate a welding arc between the electrode and workpiece, and an electrical continuity sensor connected to the electrical path and being operable for sensing the opening and closing of electrical continuity of the electrical path and for generating a trigger signal to the control arrangement in response to sensing the closing of continuity of the electrical path by the electrode making physical contact with the workpiece. The control arrangement in response to receipt of the trigger signal from the continuity sensor causes the electric motor to operate in a reverse mode to retract the electrode from physical contact with the workpiece to a welding position located a predetermined distance from the workpiece. A vacuum relay is operable to isolate the continuity sensor from the electrical path in response to receipt of an output signal generated by the control arrangement when the electrode reaches the welding position.

14 Claims, 1 Drawing Sheet

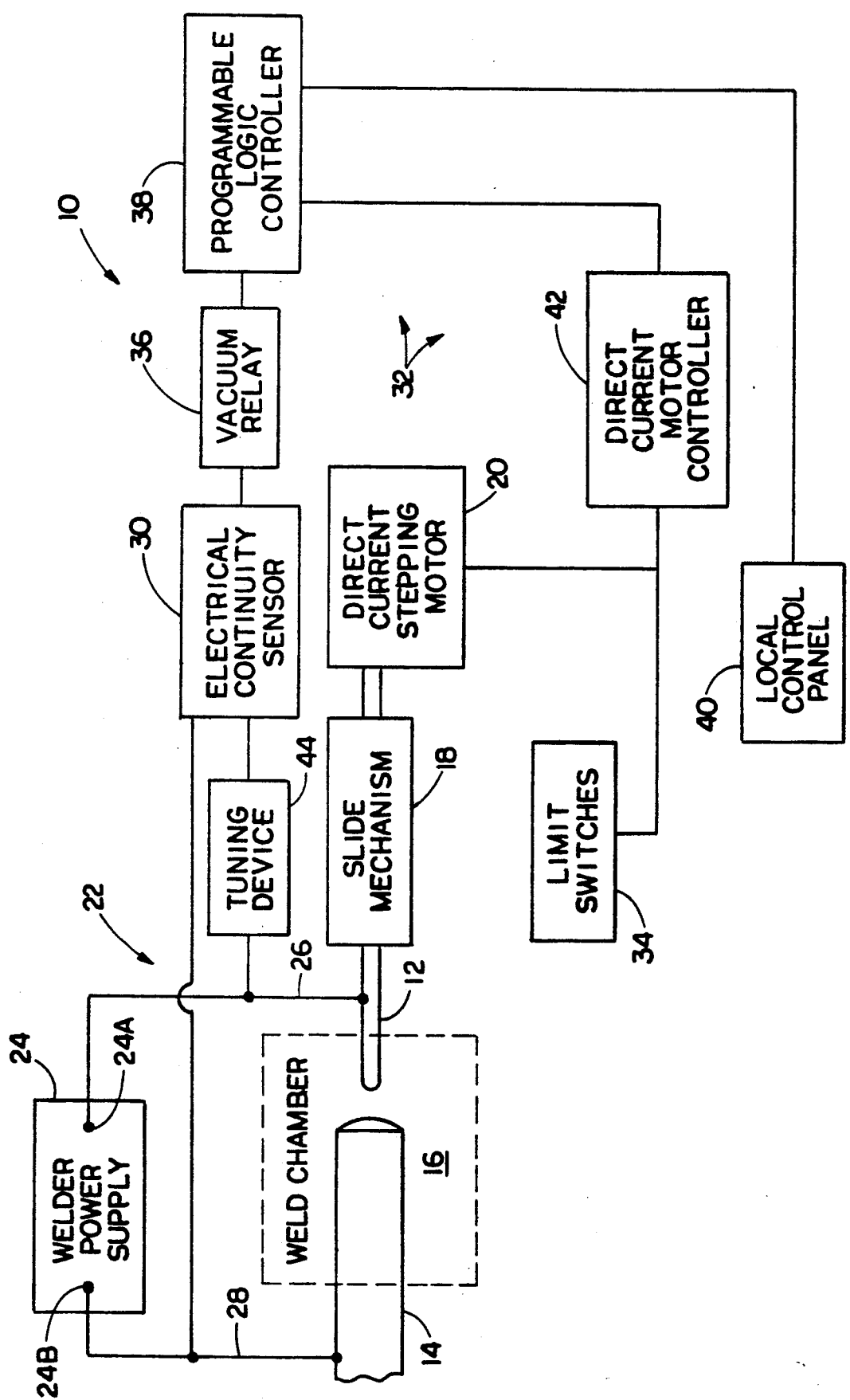

WELD ELECTRODE-TO-WORKPIECE ARC GAP SETTING APPARATUS AND METHOD

BACKGROUND OF THE INVENTION

1. Field of the Invention

The present invention relates generally to arc welding equipment and, more particularly, is concerned with an apparatus and method for accurately setting the distance, or arc gap, between a weld electrode and a workpiece in preparation for a welding operation.

2. Description of the Prior Art

Nuclear fuel and core control rods are fabricated from elongated hollow metal tubes being closed at their opposite ends by metal end plugs. These rods require high-integrity sealing of the end plugs to the tube ends to prevent in-service leakage, and to maintain internal gas pressure introduced at the time of fabrication. The end plugs are typically sealed to the ends of the tubes by using TIG (tungsten inert gas) fusion welds under helium or argon cover gas.

High quality TIG welding practice requires, among other things, close control of the physical distance, commonly called "arc gap", between the tip of the nonconsumable electrode and the workpiece. While conventional weld fixtures in many cases incorporate mechanisms for establishing proper arc gaps, for example linear slides, macroscopes with reticles and dial indicators, the actual setup and online monitoring and control of arc gap has heretofore usually been under manual control of the welding operator.

There are a number of problems with manual control. First, mechanisms to position and clamp the workpiece in place do not always achieve the desired level of accuracy and repeatability from piece-to-piece. Because it is time-consuming to do so, setting and fixing arc gap on each production workpiece is not feasible. Therefore, initial electrode gap setups remain in effect for a number of consecutive workpieces. Variability in workpiece positioning means that the resulting arc gaps are also variable.

Second, on highly automated lines, the line operator is not physically stationed at the welder at all times. As a consequence, the arc gap cannot be closely monitored, adjusted and otherwise controlled. Third, the weld electrodes erode slightly over time, thus increasing the originally preset arc gap.

Fourth, the weld electrodes used in pressurized seal welding accumulate a "ball" of weld metal on their tip. The tip ball grows and moves unpredictably from weld-to-weld, thus causing wide variations in effective arc gap. Fifth, in a number of applications, no gaging is in place for indicating preset arc gap. The gap is set according to the visual judgment of the welding operator, and is thus inaccurate and nonrepeatable.

Sixth, variability in arc gaps and use of "non-optimum" arc gaps reduce electrode life. Seventh, arc gaps which depart from a reasonably "safe" range can produce product weld quality problems, including arc-outs, shallow underpenetrated welds, tungsten inclusions from arc strikes in the molten weld puddle, etc. In addition to lowering product yields and increasing the cost of rework, undetected weld anomalies can lead to product service problems.

Consequently, a need exists for improvement of setting the arc gap in preparation for each welding operation in a way that substantially eliminates the necessity for operator skill and intervention. U.S. Pat. No. 4,439,664 to Toohey discloses an arc welding apparatus wherein physical contact of the weld electrode with the workpiece is mechanically sensed. In the Toohey apparatus, a lead screw which normally stationarily rotates to advance the weld electrode toward the workpiece is capable of a recoil movement that trips a microswitch upon the electrode contacting the workpiece. The tripped microswitch sends a signal to a control unit causing the electric motor driving the lead screw to reverse rotation for a predetermined period of time, thereby retracting the electrode a predetermined distance from the workpiece. The control unit can be set to apply voltage to initiate the welding arc automatically upon the electrode reaching the predetermined distance from the workpiece.

While the arc welding apparatus of the Toohey patent appears to be a step in the right direction, there is a continuing need to explore other design alternatives which may more effectively provide a solution to the above-described problems.

SUMMARY OF THE INVENTION

The present invention provides an weld electrode-to-workpiece arc gap setting apparatus and method designed to satisfy the aforementioned needs. The arc gap setting apparatus and method of the present invention addresses the aforementioned problems by automatically producing a highly accurate arc gap on an online, workpiece-to-workpiece basis.

Accordingly, the present invention is directed to an apparatus for setting an arc gap between a weld electrode and a workpiece. The arc gap setting apparatus comprises: (a) means for moving a weld electrode toward and away from a workpiece to respectively advance and retract the electrode into and from physical contact with the workpiece; (b) means electrically connected to the weld electrode and the workpiece for defining an electrical path to supply electrical energy thereto sufficient to generate a welding arc between the electrode and workpiece; and (c) means connectable to the electrical path defining means for sensing opening and closing of continuity of the electrical path and generating a trigger signal in response to sensing of closing of continuity of the electrical path by the making of physical contact of the electrode with the workpiece. The electrode moving means in response to receipt of the trigger signal from the electrical continuity sensing means is operable to retract the electrode from physical contact with the workpiece to a welding position located a predetermined distance from the workpiece. The apparatus also has an isolation means operable to break electrical connection between the continuity sensing means and the electrical path defining means in response to receipt of an output signal generated by the moving means when the electrode reaches the welding position.

The present invention also is directed to a method for setting an arc gap between a weld electrode and a workpiece. The arc gap setting method comprises the steps of: (a) defining an electrical path between a source of electrical power and the weld electrode and workpiece to supply electrical energy thereto sufficient to generate a welding arc between the electrode and workpiece; (b) moving a weld electrode toward a workpiece to advance the electrode into physical contact with the workpiece; (c) sensing opening and closing of continuity of the electrical path; (d) generating a trigger signal in response to sensing of closing of continuity of the electrical path due to the making of physical contact of the electrode with the workpiece; and (e) in response to receipt of the trigger signal generated upon the sensing of closing of continuity of the electrical path, moving the weld electrode away from the workpiece to retract the electrode from physical contact with the workpiece to a welding position located a predetermined distance from the workpiece. The method also includes the step of isolating from the electrical path the sensing of electrical continuity of the electrical path in response to receipt of an output signal generated when the electrode reaches the welding position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawing in which the single figure is a schematic diagram of a weld electrode-to-workpiece arc gap setting apparatus in accordance with the present invention.

DETAILED DESCRIPTION OF THE INVENTION

Referring now to the single figure of the drawing, there is shown a schematic diagram of an apparatus, generally designated 10, for automatically and accurately setting the distance, or arc gap, in accordance with the present invention, between a weld electrode 12 and a workpiece 14, such as an end plug on an end of a nuclear fuel rod tube, within a sealed weld chamber 16. The workpiece 14 is inserted into the weld chamber 16 and supported in a stationary position therein during an ensuing welding operation by any suitable well-known conventional means (not shown). Since the novelty of the arc gap setting apparatus 10 and method resides in the combination and arrangement of its components and not in the specific details of the components, it is not necessary nor beneficial for promoting an understanding of the present invention to illustrate or describe the construction of these components in detail. Such description would tend to burden the disclosure with details which are otherwise readily apparent to those skilled in the art in view of the functional description of these components presented hereinafter.

With respect to its combination of components, the arc gap setting apparatus 10 of the present invention includes support means 18 located adjacent to the weld chamber 16 for supporting the weld electrode 12, and drive means 20 drivingly coupled to the weld electrode supporting means 18. By way of example, the support means 18 can be a linearly movable precision slide mechanism, being conventional per se, that is capable of undergoing movement toward and away from the workpiece 14 to respectively advance and retract the electrode 12 along a linear path into and from physical contact with the workpiece 14. The drive means 20 can be a direct current stepping motor, also being conventional per se, that is operable in forward and reverse modes for driving the support means 18 to respectively move toward and away from the workpiece 14 and correspondingly advance and retract the electrode 12 into and from physical contact with the workpiece 14.

Also, the arc gap setting apparatus 10 includes electrical circuit means 22 electrically connected to the weld electrode 12 and the workpiece 14 for defining an electrical current flow path in order to supply electrical energy sufficient to generate a welding arc between the electrode 12 and workpiece 14. The circuit means 22 takes the form of a source of electrical energy 24, such as a conventional electrical direct current power supply, and first and second electrically conductive leads 26, 28 extending respectively from the hot and ground terminals 24A, 24B of the electrical power supply 24 to the electrode 12 and the workpiece 14.

Further, the arc gap setting apparatus 10 includes an electrical continuity sensor 30 and a control arrangement 32. The continuity sensor 30 is electrically connected across the electrical path in a short-circuited fashion respectively to the first and second conductive leads 26, 28 of the circuit means 22. The continuity sensor 30, which is of conventional makeup per se, is operable for sensing the opening and closing of electrical continuity of the electrical current flow path between the power supply 24 and the electrode 12 and workpiece 14 of which the first and second conductive leads 26, 28 are an integral part. The continuity sensor 30 also is operable to generate a trigger signal in response to sensing the closing of continuity of the electrical path such as occurs when the electrode 12 makes physical contact with the workpiece 14.

The control arrangement 32 can be manually actuated to initiate operation of electric stepping motor 20 in its forward mode for driving the slide mechanism 18 to advance the electrode 12 into contact with the workpiece. The control arrangement 32 receives the trigger signal outputted by the continuity sensor 30 and in response thereto causes the electric stepping motor 20 to immediately cease further operation in its forward mode and to switch to its reverse mode and thereby cause the slide mechanism 18 to retract the electrode 12 from physical contact with the workpiece 14 to a desired welding position being located a predetermined distance from the workpiece 14. In such manner, the continuity sensor 30 detects when physical contact has been achieved so that immediate action can be taken to stop further movement of the electrode 12. Limit switches 34 are associated with the slide mechanism 18 as a precaution to stop the operation of the motor and thereby prevent overtravel of the slide mechanism 18 should the motor fail to receive or respond to the control arrangement 32.

Additionally, the arc gap setting apparatus 10 employs an isolation means 36, such as in the form of a conventional vacuum relay, that is electrically connected to the control arrangement 32. The vacuum relay 36 is electrically connected to the first conductive lead 26 via the continuity sensor 30. On the one hand, the vacuum relay 36 is operable to make an electrical connection between the continuity sensor 30 and the electrical current flow path in response to actuation by the control arrangement 32 when operation of the stepping motor 20 is initiated in the forward mode for driving the slide mechanism 18 to advance the electrode 12 into contact with the workpiece 14. On the other hand, the vacuum relay 36 is operable to electrically isolate the continuity sensor 30 from the electrical current flow path in response to receipt of an output signal generated by the control arrangement 32 when the electrode 12 reaches the predetermined welding position so that the continuity sensor 30 will not be damaged by the flow of sufficient electrical energy about the flow path to sustain the generation of a welding arc in the ensuing welding operation.

Preferably, the control arrangement 32 is composed of programmable logic controller (PLC) 38 electrically connected to the power supply 24 and the vacuum relay 36 and to a local control panel 40 having the necessary indicator lights, switches and keys to monitor and control the operation of the PLC 38 and the rest of the components of the apparatus 10. The control arrangement 32 also includes a direct current motor controller 42 interposed between the stepping motor 20 and the PLC 38.

Precedent to the operation of the apparatus 10 to set the arc gap between the weld electrode 12 and the workpiece 14, the workpiece is first presented to the weld chamber 16 and chucked in a stationary position either manually by an operator or automatically by line handling mechanisms. Initiation of the arc gap setting operation of the apparatus 10 may be accomplished either by a "start" pushbutton if a manual operation, or via line PLC logic conditions if an automatic operation. At initiation, the vacuum relay 36 closes and a signal is sent to the direct current stepping motor 20 to begin slide movement toward the stationary workpiece 14. When the tip of the electrode 12 physically contacts the workpiece 14, electrical continuity is made and sensed by the continuity sensor 30 and a trigger signal is sent to the motor controller 42 via the PLC 38. The trigger causes an immediate reversal of the slide direction and a precise amount of travel away from the workpiece 14 to set the arc gap. Upon completion of the motor movement function, a "cycle done" output signal is delivered by the motor controller 42 to the vacuum relay 36 via the PLC 38 which opens the relay to effect electrically isolation of the continuity sensor 30 from the welding current flow path and thereby enable welding operations to proceed.

It can be seen that the continuity sensor 30 is protected by the vacuum relay 36. Since continuity must be sensed across the same electrical path used by welding energy, it is necessary to isolate the continuity sensor 30 from large currents seen during welding. Also, the circuit means 22 includes a tuning device 44, such as a conventional potentiometer, which has the capability of tuning the continuity sensor 30 for sensitivity. This may be necessary because the actual open circuit resistance between the electrode 12 and the workpiece 14 (at ground potential) may not be infinite. It can in fact be on the order of a few thousand ohms depending on the condition of the electrode seals and chamber cleanliness, and also the attachment and design of supplemental arc starting equipment (not shown) which is typically attached to the welding circuit path.

The commercial direct current motor controller 42 which can be used has provisions for storing up to seven distinct motor movement programs. As implemented, this controller uses one program slot for each "jog in" and "jog out" commands, one slot for the "home" command, and one slot for each of four gap set program routines. Each gap set routine has a slightly different "back-off" travel distance, within the sanctioned range of gap values. Note that it is necessary to provide some flexibility over actual arc gap to be used online. The particular gap program selected by the operator will depend on the age of the electrode, the behavior and effectiveness of arc starting equipment in use, and the visual appearance of online welds.

Local system controls at the control panel 40 can include a springloaded "jog" switch for operator override of electrode position; a "home" pushbutton to clear overtravel conditions and bring the slide to a neutral center position for electrode changeout; a multi-position selector switch to allow selection of the nominal gap value desired (directs particular gap setting programs to be called from the motor controller); on/off switch to take the system completely offline; and illuminated indicators to signal power on, overtravel conditions, home position, "weld ready" condition, and momentary indication of continuity.

The system interfacing is designed such that all signals to and from the local control panel 40, and to and from the motor controller 42, go through the PLC 38 which serves as a master controller. While interfacing of some functions could have been accommodated directly through taps on the motor controller itself, it is deemed prudent to provide for direct control through PLC inputs and outputs, via associated PLC ladder logic software, since PLC hardware is intrinsically more failsafe.

Some of the advantages and benefits of the above-described arc gap apparatus and method of the present invention are as follows. First, the variability in the positioning of the workpiece relative to the weld electrode no longer impacts the process, because the arc gap setting device does not depend on relative workpiece position to effect an accurate gap. The system "seeks" the rod and provides for accurate gap setting only after it senses the surface of the rod, wherever it is.

Second, manual judgment and input to gap setting is removed from the process. Operator flexibility is limited to selecting from a given number of precoded arc gap settings which are all within the "safe" range for this process variable.

Third, electrode erosion and tip configuration changes due to "balling" do not adversely impact arc gap settings, since a new and precise gap is set with respect to each workpiece as introduced. The gap set is based on the actual electrode tip end face, irregardless of how it has been altered by the preceeding weld or welds.

Fourth, in theory, electrode life is extended because the "ideal" arc gap is reliably and consistently maintained. There are no extra duty requirements or higher current density demands on the electrode from too-large arc gaps. Arc strikes (electrode-weld puddle contact) from too-small gaps, which render the electrode immediately unusable, are eliminated. Fifth, a number of product quality detractors should be eliminated, including tungsten inclusions from arc strikes, underpenetration and/or IDUC from excessive arc gaps, and incomplete welds and arc-outs caused by bad gap settings or online gap drifts.

Sixth, DC motor-driven electrode control and movement can be readily integrated with new types of online adaptive control of the welding process. For example, arc voltage data is routinely captured now for information and for online PLC "fault traps" for potentially bad welds. If arc voltage is sensed to be approaching warning limits, a simple feedback loop from the PLC can be added to automatically change the identity of the particular gap size program being called from the motor controller.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An apparatus for setting an arch gap between a weld electrode and a workpiece, comprising:
    (a) means for moving a weld electrode toward and away from a workpiece to respectively advance and retract the electrode relative to a welding position into and from physical contact with the workpiece;
    (b) means electrically connected to the weld electrode and the workpiece for defining an electrical path to supply electrical energy thereto sufficient to generate a welding arc between the electrode and workpiece;
    (c) means electrically connectable to said electrical path defining means for sensing the opening and closing of continuity of said electrical path and generating a trigger signal in response to sensing of closing of continuity of said electrical path due to the making of physical contact of the electrode with the workpiece;
    (d) said electrode moving means in response to receipt of said trigger signal from said continuity sensing means being operable to retract the electrode from physical contact with the workpiece to said welding position located a predetermined distance from the workpiece, said electrode moving means in response to said electrode reaching said welding position being operable to generate an output signal; and
    (e) isolation means connected to said electrode moving means and to said electrical path defining means via said continuity sensing means for making electrical connection between said continuity sensing means and said electrical path defining means in response to said electrode moving means advancing the electrode into contact with the workpiece, said isolation means also for breaking electrical connection between said continuity sensing means and said electrical path defining means in response to receipt of said output signal from said electrode moving means generated when the electrode reaches said welding position.

2. The apparatus as recited in claim 1, wherein said electrode moving means includes means for supporting a weld electrode for movement toward and away from the workpiece to respectively advance and retract the electrode into and from contact with the workpiece.

3. The apparatus as recited in claim 2, wherein said electrode moving means also includes means drivingly coupled to said weld electrode supporting means and being operable in forward and reverse modes for driving said supporting means to respectively move toward and away from the workpiece and correspondingly advance and retract the electrode into and from contact with the workpiece.

4. The apparatus as recited in claim 3, wherein said driving means is a direct current reversible stepping motor.

5. The apparatus as recited in claim 3, wherein said electrode moving means further includes control means connected to said continuity sensing means and said driving means and being actuatable for switching the operation of said driving mean between said forward and reverse modes and for controlling operation thereof in each of said modes.

6. The apparatus as recited in claim 5, wherein said control means is manually actuatable to initiate operation of said driving means in said forward mode for driving said supporting means to advance the electrode into physical contact with the workpiece.

7. The apparatus as recited in claim 5, wherein said control means is automatically actuatable to switch operation of said driving means from said forward mode to said reverse mode in response to receipt of said trigger signal from said continuity sensing means for driving said supporting means to retract the electrode from physical contact with the workpiece to said welding position located a predetermined distance from the workpiece.

8. The apparatus as recited in claim 1, wherein said isolation means is a vacuum relay.

9. The apparatus as recited in claim 1, wherein said electrical path defining means includes:
    a source of electrical energy sufficient to generate a welding arc between the electrode and workpiece; and
    an electrical circuit having first and second electrically conductive leads extending from said electrical power source respectively to the electrode and the workpiece.

10. The apparatus as recited in claim 9, wherein said continuity sensing means is connected in short circuit fashion across said first and second conductive leads.

11. An apparatus for setting an arc gap between a weld electrode and a workpiece, comprising:
    (a) means for supporting a weld electrode for movement toward and away from a workpiece to respectively advance and retract the electrode into and from physical contact with the workpiece;
    (b) means drivingly coupled to said weld electrode supporting means and being operable in forward and reverse modes for driving said supporting means to respectively move toward and away from the workpiece and correspondingly advance and retract the electrode into and from physical contact with the workpiece;
    (c) means electrically connected to the weld electrode and workpiece and defining an electrical path for supply of electrical energy thereto sufficient to generate a welding arc between the electrode and workpiece;
    (d) means capable of electrical connection in a short circuit fashion across said electrical path defining means and being operable for sensing electrical continuity of said electrical path, the continuity of said electrical path being closed when the electrode makes physical contact with the workpiece and being open when the electrode breaks physical contact with the workpiece, said continuity sensing means capable of generating a trigger signal in response to sensing the closing of continuity of said electrical path;
    (e) control means connected to said continuity sensing means and said driving means and being actuatable for switching the operation of said driving mean between said forward and reverse modes and for controlling operation thereof in each of said modes, said control means also being manually actuatable to initiate operation of said driving means in said forward mode for driving said supporting means to advance the electrode into physical contact with the workpiece, said control means further being automatically actuatable to switch operation of said driving means from said forward mode to said reverse mode in response to receipt of said trigger signal from said continuity sensing means for driving said supporting means to retract the electrode from physical contact with the workpiece to a welding position located a predetermined distance from the workpiece, said control means further being operable to generate an output signal in response to the electrode reaching the welding position; and (f) isolation means connected to said control means and to said electrical path defining means via said continuity sensing means for making electrical connection between said continuity sensing means and said electrical path defining means in response to actuation by said control means of said driving means in said forward mode to drive said supporting means so as to advance the electrode into physical contact with the workpiece, said isolation means also for breaking electrical connection between said continuity sensing means and said electrical path defining means in response to said output signal from said control means generated when the electrode reaches the welding position.

12. The apparatus as recited in claim 11, wherein said isolation means is a vacuum relay.

13. The apparatus as recited in claim 11, wherein said electrical path defining means includes:

a source of electrical energy sufficient to generate s welding arc between the electrode and workpiece; and an electrical circuit having first and second electrically conductive leads extending from said electrical power source respectively to the electrode and the workpiece.

14. A method for setting an arc gap between a weld electrode and a workpiece, comprising the steps of:

(a) defining an electrical path from a source of electrical power to a weld electrode and to a workpiece to supply electrical energy thereto sufficient to generate a welding arc between the electrode and workpiece;

(b) moving the weld electrode toward the workpiece to advance the electrode into physical contact with the workpiece;

(c) sensing opening and closing of electrical continuity of said electrical path;

(d) generating a trigger signal in response to sensing of closing of continuity of said electrical path due to the making of physical contact of the electrode with the workpiece;

(e) in response to receipt of the trigger signal generated upon sensing of the closing of continuity of the electrical path, moving the weld electrode away from the workpiece to retract the electrode from physical contact with the workpiece to a welding position located a predetermined distance from the workpiece; and (f) isolating the sensing of electrical continuity from the electrical path in response to receipt of an output signal generated when the electrode reaches the welding position.

* * * * *